P. MUELLER.
SEAT WASHER AND STEM.
APPLICATION FILED AUG. 11, 1916.
1,311,832.
Patented July 29, 1919.
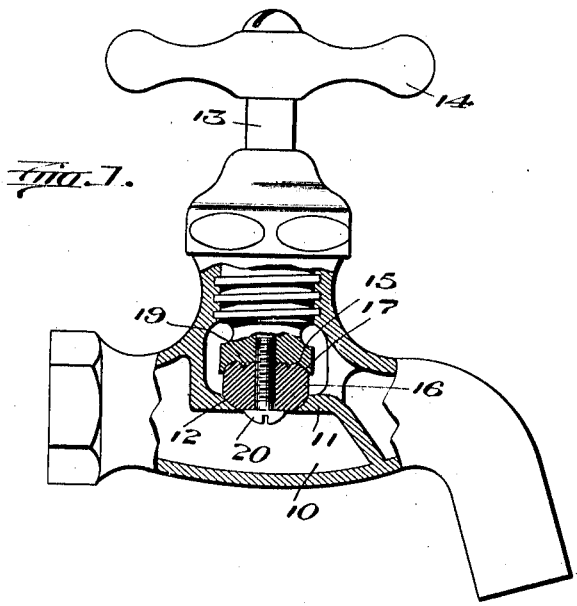
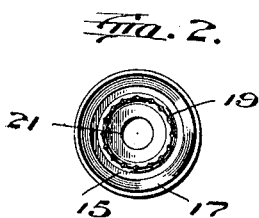
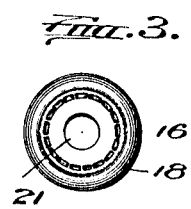
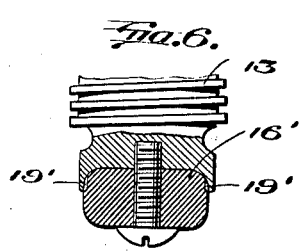
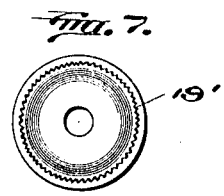
Inventor
Philip Mueller

UNITED STATES PATENT OFFICE.

PHILIP MUELLER, OF DECATUR, ILLINOIS.

SEAT-WASHER AND STEM.

1,311,832.   Specification of Letters Patent.   Patented July 29, 1919.

Application filed August 11, 1916. Serial No. 114,403.

*To all whom it may concern:*

Be it known that I, PHILIP MUELLER, a citizen of the United States, residing at Decatur, in the county of Macon and State of Illinois, have invented new and useful Improvements in Seat-Washers and Stems, of which the following is a specification.

This invention relates to cocks or bibs and has particular reference to the construction of valve head or seat washer.

One of the essential objects of this invention is to provide a valve head which is reversible, so that when one end or seating face of the head or washer becomes worn and inefficient in that it does not properly close off the water when brought into engagement with its seat, the other end of the head or washer may be used as a seating face, and thus the entire usefulness of the washer is utilized and the operative life of the head is greatly prolonged.

It is a further object of this invention to facilitate assemblage of the head upon the valve stem, and particularly to prevent rotation of the valve head upon the stem while it is being attached to or detached from the same. The means for preventing rotation of the valve head relative to the stem is so located that the seating faces of the head are in no way injured thereby, so that an end of the valve head after the same has been in engagement with said means may be used as the seating face of the head.

A further object of this invention is to provide effective and inexpensive means for preventing the seat washer from becoming accidentally detached from the stem or displaced relatively thereto. As now generally constructed, the valve stem is provided with an enlarged base which is recessed or bowl-shaped for the reception of the upper end of the seat washer, and this recess or bowl, of the seat washer, and this recess or bowl, heretofore, has been made perfectly smooth both on its face and its interior wall. The enlarged base is centrally drilled and tapped and the seat washer has a central through aperture. A fastening screw is passed through the central aperture of the washer, which aperture it fits loosely, and the screw is then threaded into the tapped hole in the center of the valve stem, the screw having a head which clamps the seat washer or valve head to the stem.

In service, after the valve or cock has been closed for some time, it has been found that the seat washer will stick or adhere to the valve seat, due to corrosion or other causes, and thus the seat washer is held against rotation upon the valve seat when the valve stem is rotated. For like reasons, the head of the fastening screw will adhere or stick to the washer. When the seat washer and the fastening screw stick in the manner above described, the result is that, when the handle is turned to rotate the stem and open the cock, the fastening screw becomes unscrewed from the tapped hole in the base of the stem, and this is especially true as the fastening screw is quite small, and, therefore, it is impossible to cut threads thereon which will perfectly fit the interior threads in the tapped hole in the stem. This occurrence necessitates cutting off of the water, the expense of repairing the cock, and has usually resulted in the destruction of the seat washer.

In some cases, the seat washer will at first stick to the valve seat, but will become unseated therefrom simultaneously with the breaking loose of the threads of the screw with the result that the screw will be pushed to one side and the washer forced out of alinement with the valve seat, due to the pressure of water. When this occurs, and it is attempted to close the cock, the corner of the seat washer rests on the washer seat and the valve will not close, or if an extraordinary effort is made to close the cock, the seating face of the seat washer or head will become mutilated.

My invention insures the longest possible life to the seat washer, it being reversible, and I, at the same time, eliminate the possibility of it being necessary to take the valve or cock apart during the life of the seat washer, except to reverse the same.

The above and other objects of my invention are obtained by the structure described in the following specification and illustrated in the accompanying drawings, wherein—

Figure 1 is an elevational view of a bib or cock, a portion thereof being broken away to disclose the application of my invention thereto.

Fig. 2 is a bottom end view of the valve stem shown in Fig. 1, the valve head or washer being removed.

Fig. 3 is a top plan view of the valve head.

Fig. 4 is a side view of the valve head; and

Fig. 5 is a bottom end view of the valve head shown in Fig. 1.

Fig. 6 is a sectional view taken through the lower end of a valve stem and seat washer and showing another embodiment of my invention.

Fig. 7 is a bottom end view of the valve stem shown in Fig. 6, the washer being removed.

Referring to the drawings wherein like numerals represent like parts in the several views, in Fig. 1, I have illustrated a cock or bib which may be of any suitable construction, in the present instance, the same being disclosed as having a body portion 10 provided with a diaphragm or web 11 having a central opening, the upper edge of which is beveled to form a somewhat conical valve seat 12. 13 designates the stem of the cock which carries at its upper end a handle 14 by means of which the stem may be turned to move the valve head to and from its seat. Any suitable means may be provided for causing reciprocation of the stem when the same is rotated.

The lower end of the stem is somewhat enlarged in diameter and is recessed so as to provide a chamber 15 adapted to receive a valve head or washer 16. The wall 17 of the recess or chamber 15 converges inwardly so that the chamber is somewhat conical in shape.

My improved seat washer or valve head 16 comprises a circular disk of suitable thickness having its opposite ends beveled as at 18, which beveled surfaces are the seating faces of the head. It will be noted from an inspection of the drawing that the ends of the washer are conical, conforming in shape to the conical recess 15 in the end of the valve stem and to the valve seat 12 in the diaphragm 11.

In Figs. 1 to 3, the end of the valve stem within the chamber 15 is provided with an annular rib 19 which is suitably serrated, as shown, so as to provide a rough ridge which is adapted to be embedded in the face of the washer or head 16 when the latter is in place upon the stem. The ridge or rib is so located, however, as to engage in the ends of the washer 16 within the conical seating faces 18 so that these seating faces are in no way mutilated by engagement with the rib 19.

In Figs. 6 and 7, I have shown another embodiment of my invention wherein the interior wall 17 of the recess in the enlarged end of the stem is corrugated as at 19'. This roughened or corrugated portion of the stem, which for purposes of clearness is shown somewhat exaggerated in the drawings, is preferably outside of the seating surface proper of the valve head. However, the roughened surface 19' need not be such as will permanently mutilate the seat washer, and if desired, the roughened surface may consist of slight nicely rounded corrugations which will permit the washer to return to its normal shape after the same is reversed.

The head or washer 16 may be secured to the stem in any suitable manner, but by way of illustration, I have shown in the present instance, the head detachably secured to the stem by means of a screw 20 which passes through an axial opening 21 in the head and extends into a central bore in the end of the stem with which it is in threaded engagement.

It will be noted that either one of the beveled surfaces 18 of the valve head 16 may be utilized as the seating face of the head, and that when the head is in position within the chamber 15, the end of the head engages the annular rib 19. When the screw 20 is turned into place to secure the head upon the stem, the head does not rotate due to the serrations of the rib being embedded in the end of the head. The upper end of the head fits snugly within the recess so that expansion or deformation thereof is prevented when the other end of the head is forced to its seat. The annular rib 19, in Figs. 1 to 5, engages the end of the head within the seating surfaces 18, while in Figs. 6 and 7, the roughened surface 19' is preferably located outside of the seating surfaces 18, so that these surfaces are not injured by the serrations or corrugations on the stem.

It is to be understood that my invention is susceptible of various modifications and changes which would be within the spirit of my invention without departing from the scope of the following claims.

What is claimed is:—

1. In combination, a valve-stem having upon its end a serrated rib, and a valve-head fixedly carried by said stem and having its opposite ends beveled to form seating surfaces, said rib being spaced radially from said seating surfaces of the head to prevent mutilation thereof.

2. In combination, a valve head having seating surfaces upon its opposite ends, a valve stem having a recess in its end adapted to receive said head, a serrated rib within the recess and within the seating surfaces of said head, and means for detachably securing the head to the stem.

In testimony whereof I have hereunto set my hand in presence of two subscribing witnesses.

PHILIP MUELLER.

Witnesses:
C. N. WAGENSELLER,
J. W. WELLS.